(12) United States Patent
Boecker et al.

(10) Patent No.: US 9,160,245 B2
(45) Date of Patent: Oct. 13, 2015

(54) METHOD FOR OPERATING A CONVERTER IN A SYSTEM FOR GENERATING ELECTRICAL ENERGY

(75) Inventors: Joachim Boecker, Berlin (DE); Michael Loenneker, Paderborn (DE)

(73) Assignee: GE ENERGY POWER CONVERSION TECHNOLOGY LIMITED (GB)

( * ) Notice: Subject to any disclaimer, the term of this patent is extended or adjusted under 35 U.S.C. 154(b) by 45 days.

(21) Appl. No.: 13/344,060

(22) Filed: Jan. 5, 2012

(65) Prior Publication Data

US 2012/0182774 A1    Jul. 19, 2012

(30) Foreign Application Priority Data

Jan. 13, 2011  (DE) .................. 10 2011 002 657

(51) Int. Cl.
*H02M 5/45*  (2006.01)
*H02M 5/27*  (2006.01)
*H02P 9/02*  (2006.01)
*H02P 13/06*  (2006.01)
*H02M 3/34*  (2006.01)

(52) U.S. Cl.
CPC ................. *H02M 5/272* (2013.01); *H02P 9/02* (2013.01); *H02P 13/06* (2013.01); *Y02E 10/76* (2013.01)

(58) Field of Classification Search
CPC ....... H02P 2101/15; H02P 9/04; H02P 9/105; H02P 29/022; H02P 29/024; H02P 9/10; H02P 6/08; H02P 9/42; F03D 9/003; F03D 3/067; F03D 3/068; F05B 2270/32; F05B 2270/337; F05B 2270/20; Y02E 10/723; Y02E 10/72

USPC .......................................... 363/95–98, 34, 37
See application file for complete search history.

(56) References Cited

U.S. PATENT DOCUMENTS

| | | | | |
|---|---|---|---|---|
| 6,657,322 B2 * | 12/2003 | Skibinski et al. | ............. | 307/105 |
| 6,680,856 B2 * | 1/2004 | Schreiber | ........................ | 363/71 |
| 6,744,650 B2 * | 6/2004 | Mahlein et al. | ................ | 363/149 |
| 7,787,266 B2 * | 8/2010 | Janssen et al. | .................. | 363/37 |
| 2004/0022081 A1 * | 2/2004 | Erickson et al. | ............. | 363/159 |

(Continued)

FOREIGN PATENT DOCUMENTS

EP    1670135 A1    6/2006

OTHER PUBLICATIONS

J. Rodriguez et al., "A Vector Control Technique for Medium Voltage Multilevel Inverters", pp. 173-178.

(Continued)

*Primary Examiner* — Adolf Berhane
*Assistant Examiner* — Henry Lee, III
(74) *Attorney, Agent, or Firm* — Parks-Wood LLC

(57) ABSTRACT

Described is a method for operating a converter for a system for generating electrical energy. In an embodiment of the method, the output voltage of the converter is converted to a d, q coordinate system, wherein the d, q coordinate system is assigned to the frequency of the voltage for the energy supply grid. A desired value is furthermore specified in the d, q coordinate system, several momentary or future values are determined from the output voltage in the d, q coordinate system for different switch positions of the converter, deviations between the desired value and the momentary or future values are determined in the d, q coordinate system, and the converter is switched to one of the switch positions in dependence on these deviations.

19 Claims, 6 Drawing Sheets

(56) References Cited

U.S. PATENT DOCUMENTS

2009/0265040 A1    10/2009  Paluszek et al.
2010/0031670 A1*   2/2010   Hoffman et al. ................. 60/793
2011/0018265 A1*   1/2011   Hoffmann et al. ................ 290/7

OTHER PUBLICATIONS

Examination report for German Application No. DE 10 2011 002 657.6.

* cited by examiner

METHOD FOR OPERATING A CONVERTER IN A SYSTEM FOR GENERATING ELECTRICAL ENERGY

PRIORITY STATEMENT

The present application hereby claims priority under 35 U.S.C. §119 to German patent application number DE 10 2011 002 657.6 filed Jan. 13, 2011, the entire contents of which are hereby incorporated herein by reference.

FIELD

At least one embodiment of the invention generally relates to a method for operating a converter in a system for generating electrical energy. At least one embodiment of the invention also generally relates to a corresponding system for generating the electrical energy.

BACKGROUND

A known system is provided with a generator that is connected to a converter which, in turn, is connected to an energy supply grid. The frequency of the voltage generated by the generator is variable. A plurality of different switch positions can be realized with the converter.

This system can be used to connect an energy producer, for example a wind electrical energy plant, to a public three-phase grid. The wind electrical energy plant operates the generator with a variable speed. The frequency of the voltage generated by the generator is thus also variable and must be adapted to the substantially constant frequency of the three-phase grid, achievable with the aid of the converter. Numerous controls and/or adjustments are known for these converters.

SUMMARY

In at least one embodiment of the present invention, a method is provided for operating a converter for said system which permits an improved control and/or adjustment.

A system is also disclosed.

According to at least one embodiment of the invention, the output voltage from the converter is converted to a d, q coordinate system, wherein the d, q coordinate system is assigned to the frequency of the voltage from the energy supply grid. A desired value is predetermined in the d, q coordinate system. Several momentary or future values for different switch positions of the converter are furthermore determined from the output voltage in the d, q coordinate system. Following this, deviations between the desired value and the momentary and future values are determined in the d, q coordinate system and the converter is subsequently switched in dependence on the deviations to one of the switch positions.

According to at least one embodiment of the invention, the control or adjustment of the converter takes place in the d, q coordinate system. For this, the d, q coordinate system "rotates" along with the energy supply grid. As a result, considerably less expenditure is necessary for determining the variables required for the control or adjustment than is the case according to the prior art. In particular, the desired value in the d, q coordinate system represents a fixed point which can easily be compared to the computed momentary or future values. The resulting deviations are then used as basis for triggering the converter.

The converter output voltage is preferably first converted to a $\alpha$, $\beta$ coordinate system and then to a d, q coordinate system, wherein this represents a particularly simple option for converting the output voltage from the standard r, s, t coordinate system via the $\alpha$, $\beta$ coordinate system to the d, q coordinate system.

According to one embodiment of the invention, the desired value is a desired output value and the momentary values are trajectories for the output voltages belonging to the converter switch positions. In that case, a voltage modulation is realized with an embodiment of the invention.

It is particularly advantageous if those trajectories are determined which are closest to the desired output voltage and if the converter is switched to the position which can be used to generate the output voltage which is assigned to the closest trajectory, wherein this represents a particular simple method of realizing the aforementioned voltage modulation.

The desired value for one embodiment of the invention is a desired output current and the future values are future output currents for different converter switch positions. In that case, a first variant of a current adjustment is realized with an embodiment of the invention.

It is particularly advantageous if the future output current is determined which is closest to the desired output current and if the converter is switched to the switch position which can be used to generate the output voltage that is assigned to the closest future output current.

The desired value according to one embodiment of the invention is a desired output current value and the momentary values are derivations of an output current value for different switch positions of the converter, wherein this relates to a second variant of a current control or adjustment.

It is particularly advantageous if the switch position is selected for which the indicator of the derivation is closest to the desired output current and the converter is switched to the switch position which can be used to generate the output voltage that is assigned to closest derivation of the output current.

With the aforementioned embodiments of the invention, it is particularly advantageous if the desired value is specified in dependence on the energy supply grid. In this way, the voltage generated by the generator can be adapted to the voltage of the energy supply grid.

BRIEF DESCRIPTION OF THE DRAWINGS

Additional features, options for use and advantages of the invention follow from the description below of example embodiments of the invention which are shown in the Figures. All described or shown features by themselves or in any optional combination form the subject matter of the invention, regardless of how they are combined in the patent claims or the references back, as well as regardless of their formulation and/or representation in the description and/or in the Figures.

DETAILED DESCRIPTION OF THE EXAMPLE EMBODIMENTS

Figure 1:
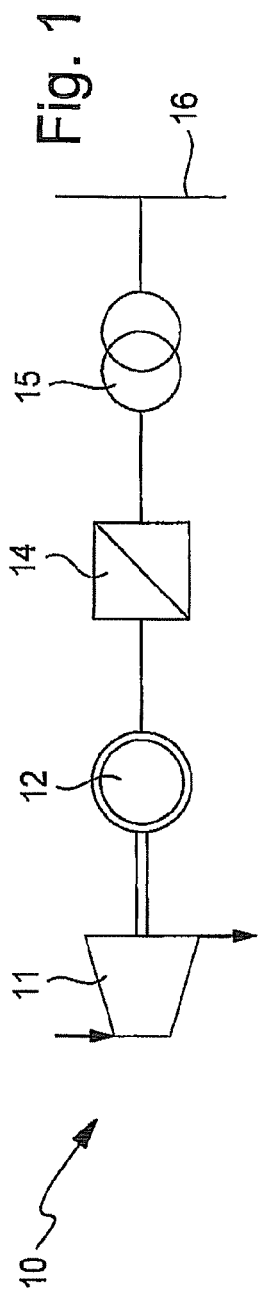
FIG. 1 shows a schematic block diagram of an example embodiment of a system for generating electrical energy.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows a system 10 for generating and converting electrical energy. In general, an energy producer 11 is provided which drives a generator 12 via a mechanical coupling. The energy producer can be a gas turbine or a water turbine or the like, or it can be a wind electrical energy plant. The generator 12 in particular can be a synchronous generator.

The generator 12 is connected to a power electronic converter 14 which, in turn, is connected via a transformer 15 to an energy supply grid 16. The energy supply grid 16 in particular can be a public three-phase grid, for example with a voltage of 110 kV and a frequency of 50 Hz or 60 Hz.

The electrical energy produced by the energy producer 11 with the aid of the generator 12 is fed via the converter 14 and the transformer 15 into the energy supply grid 16.

The generator 12 is driven by the energy producer 11 with a rotational speed that can assume different values. For example, it is possible when using a gas turbine that the generator 12 speed is adjusted to different values, meaning it is adjusted to the actual efficiency of the gas turbine. In particular with a wind electrical energy plant it is also possible that the speed of the generator 12 is variable within a predetermined range.

In dependence on the generator 12 speed, the frequency of the voltage supplied by the generator 12 can have an adjustable or variable value. Corresponding thereto, the voltage supplied by the generator 12 can also be variable. In the following example, we proceed on the assumption that the frequency of the voltage supplied by the generator 12 is higher than the frequency of the voltage of the energy supply grid 16, even if this is not an absolute requirement.

Figure 2:
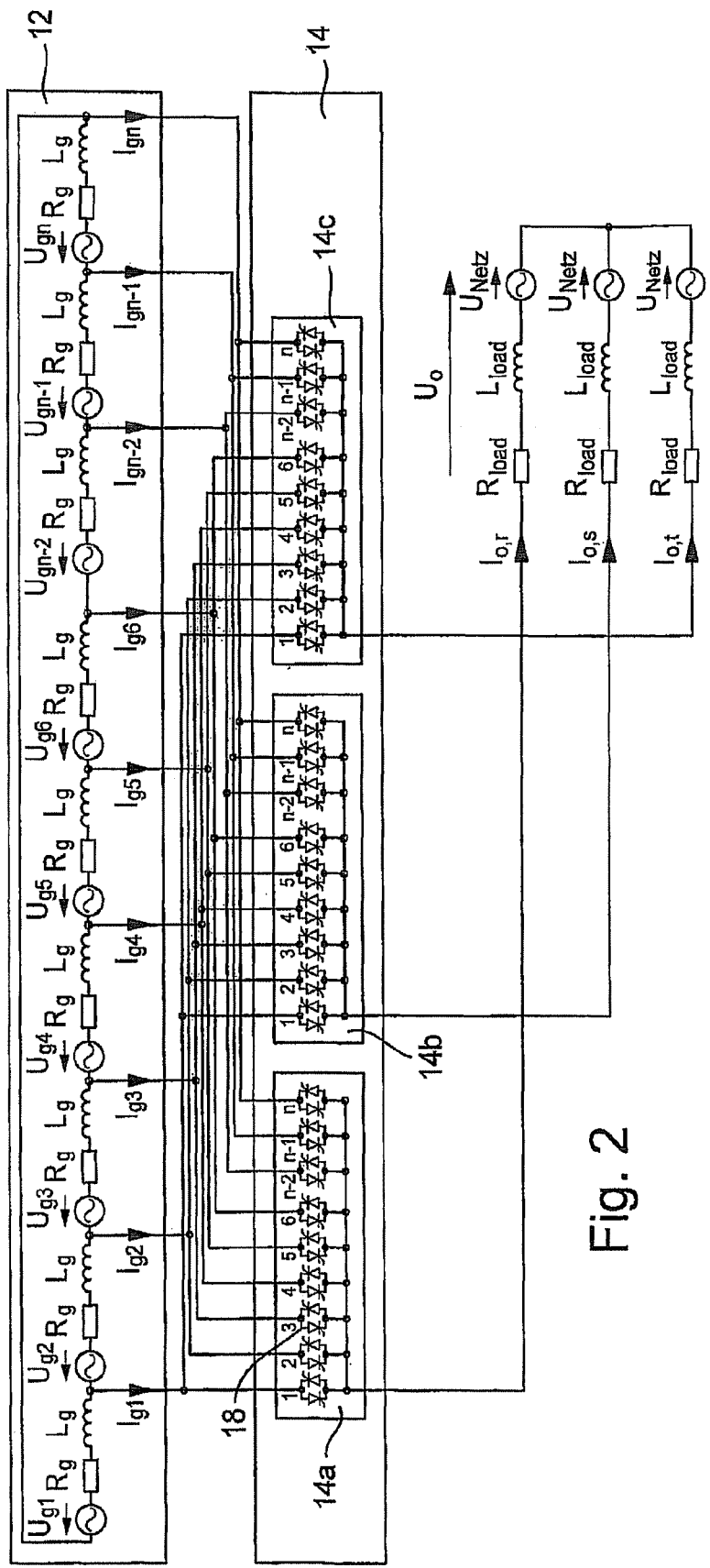
FIGS. 2 and 3 show a schematic diagram and a simplified block diagram of parts of the system shown in FIG. 1.

In FIG. 2, examples of the generator 12 and the converter 14 are shown in further detail. The generator 12 is an n-phase generator which can be switched, for example, in a polygon. The converter 14 is a so-called direct or matrix converter (English: cycloconverter).

Each phase of the generator 12 has an inductance $L_g$, a resistance $R_g$ and an induced voltage $U_{g, 1 \ldots n}$. Each generator phase is conducted to the outside and can carry a current $I_{g, 1 \ldots n}$. The converter 14 comprises three groups 14a, 14b, 14c with respectively n antiparallel-switched power semiconductor components 18. The parallel circuits for each of the three groups 14a, 14b, 14c are connected to the generator phases and are admitted in the active state of the power semiconductor components 18 by the generator currents $I_{g, 1 \ldots n}$.

The power semiconductor components 18 can be foreign-commutated valves, for example IGBTs (IGBT=insulated gate bipolar transistor) or IGCTs (IGCT=integrated gate commutated thyristor) which for the most part can be switched optionally. Alternatively, these can also be foreign-commutated thyristors which cannot be switched optionally.

From each of the groups 14a, 14b, 14c of power semiconductor components 18 a line leads to the energy supply grid 16 which in FIG. 2 is illustrated by the voltage $U_{net}$. In each of these lines, examples of an ohmic load $R_{load}$ and an inductive load $L_{load}$ are shown which, in particular, represent the voltage drops at the transformer 15 and the lines.

In a manner not shown herein, an electronic control unit such as a computer or a computer unit or the like is assigned to the system 10 in FIG. 1. Operating variables of the generator 12, the converter 13 and, if applicable, also the energy supply grid 16 are fed to this control unit. The control unit furthermore is connected to the power semiconductor components 18 of the converter 14 and can switch these to a conductive or non-conductive state. The control unit can be provided with a computer program for implementing specified method sequences with predetermined states for the power semiconductor components 18. In particular, the control unit is suitable for realizing the method described in the following. As a result, it is possible to influence the power semiconductor components 18 of the converter 14 as described in the following.

Figure 3:
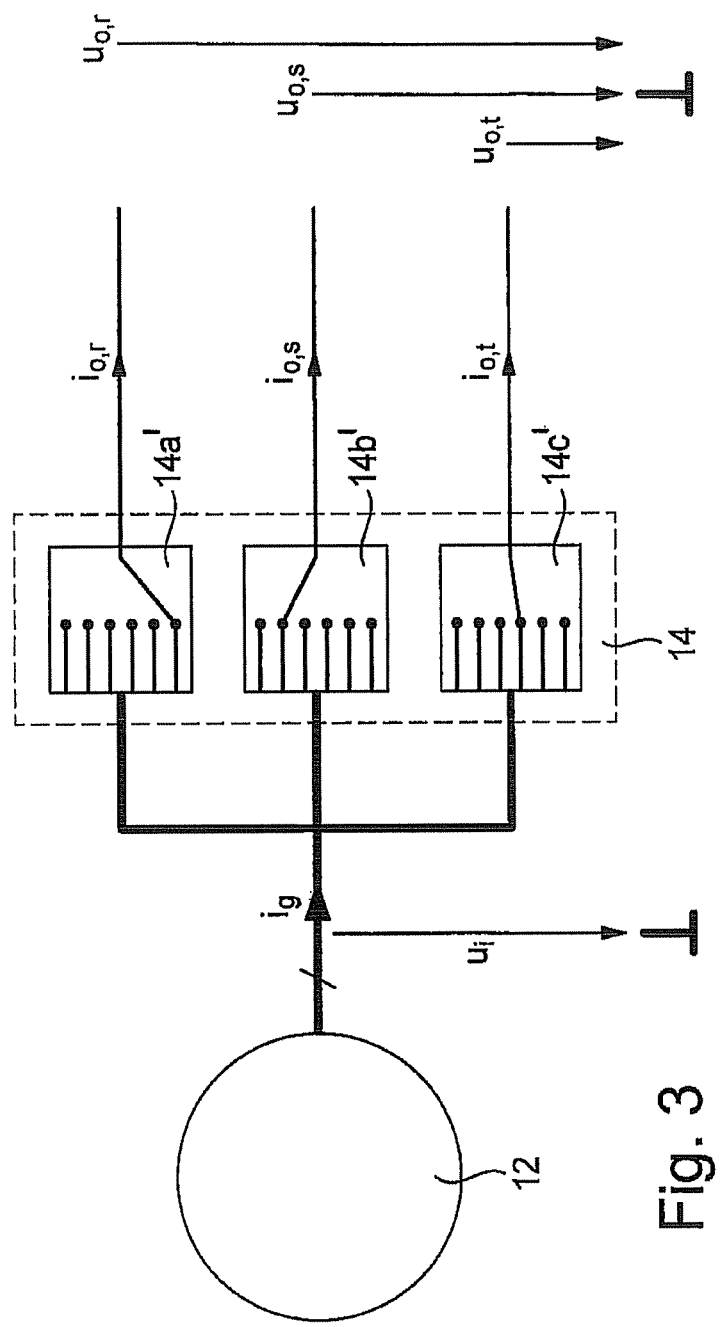

The example in FIG. 3 shows the generator 12 embodied as a six-phase generator, meaning n=6 applies. The converter 14 comprises three groups with respectively six anti-parallel switched power semiconductor components. In FIG. 3 this is shown idealized with three commutators 14a', 14b' and 14c' with respectively six switching positions.

For a simplified view, the inductances $L_g$ and the resistances $R_g$ of the generator 12 are neglected in the following and only the induced voltages $U_{g,\,1\ldots6}$ of the generator 12 are considered. A sine-shaped course for the induced voltages $U_{g,\,1\ldots6}$ is furthermore also assumed for the example.

The induced voltages $U_{g,\,1\ldots6}$ are converted to phase voltages $u_{i,\,1\ldots6}$ which are directed toward a single virtual neutral point. One phase voltage $u_{i,\,1\ldots6}$ is supplied from each commutator 14a', 14b' and 14c' to the converter 14 output where it forms one of three phases $u_{0,r}$, $u_{0,s}$, $u_{0,t}$ of an output voltage $u_0$. These phases of the output voltage $u_0$ are associated with the output currents $i_{0,r}$, $i_{0,s}$, $i_{0,t}$ of an output current $i_0$.

The three idealized commutators 14a', 14b', 14c' can assume a total of $6^3$ different switch positions for the example embodiment in FIG. 3. A total of $6^3$ differently composed output voltages $u_0$ can thus be generated through correspondingly actuating the commutators 14a', 14b' and 14c'.

Each of the possible output voltages $u_0$ can be transferred from a three-phase representation in r, s, t coordinates to a representation with α, β coordinates. This conversion can be realized, for example, with the aid of the so-called Clarke transformation. The conversion is independent of the frequency and the voltage of the energy supply grid 16 and can be based on the following equation:

$$\begin{bmatrix} u_{0\alpha} \\ u_{0\beta} \end{bmatrix} = \frac{2}{3} \begin{bmatrix} 1 & \frac{-1}{2} & \frac{-1}{2} \\ 0 & \frac{\sqrt{3}}{2} & \frac{-\sqrt{3}}{2} \end{bmatrix} \begin{bmatrix} u_{0r} \\ u_{0s} \\ u_{0t} \end{bmatrix}$$

Figure 4:
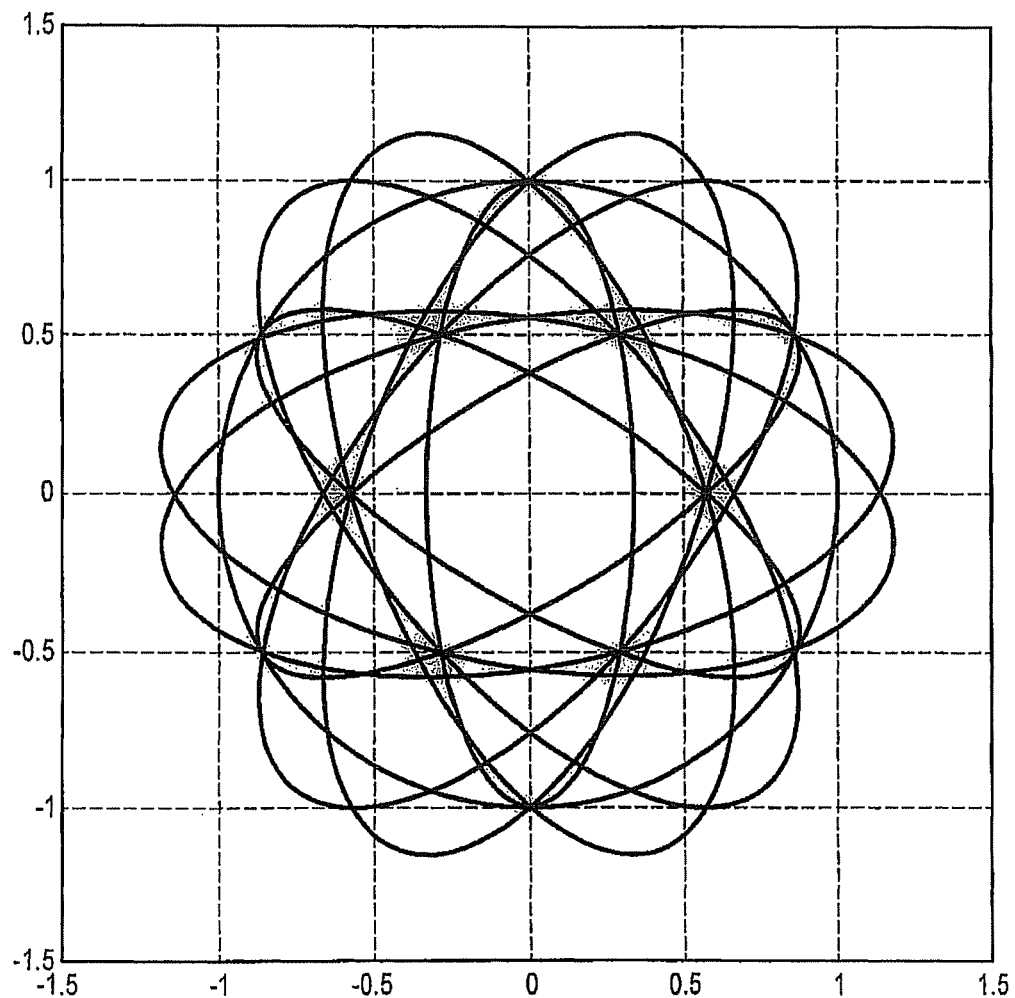
FIG. 4 shows a schematic diagram of output voltages of the circuit shown in FIG. 3 in an $\alpha$, $\beta$ coordinate system.

In FIG. 4, a number of output voltages $u_0$ are shown in the α, β coordinate system. These output voltages $u_0$ are not constant, even if the switch position of the three commutators 14a', 14b' and 14c' remains the same, but form so-called trajectories. Trajectories of this type represent the course of the voltage vectors for the output voltages $u_0$ around the zero point. In FIG. 4, the trajectories are shown with an example within an electrical cycle of 360 degrees of the generator 12. FIG. 4 furthermore shows an example of a selected number of trajectories. In particular, only those trajectories of output voltages $u_0$ are shown for which the associated voltage vectors rotate counter-clockwise.

For the following example it is assumed that the voltage supplied by the generator 12 has a frequency of 60 Hz. The voltage vectors of the trajectories in FIG. 4 thus rotate with this frequency of 60 Hz.

The output voltages $u_0$ from the α, β coordinate system in FIG. 4 are then transferred to a d, q coordinate system. This conversion can be realized, for example with the so-called Park transformation. The conversion is thus dependent on the frequency of the voltage of the energy supply grid 16 and can be based on the following equation:

$$\begin{bmatrix} u_{0d} \\ u_{0q} \end{bmatrix} = \begin{bmatrix} \text{cosine}(\phi) & \text{sine}(\phi) \\ -\text{sine}(\phi) & \text{cosine}(\phi) \end{bmatrix} \begin{bmatrix} u_{0\alpha} \\ u_{0\beta} \end{bmatrix}$$

The following applies for the angle Φ: $\Phi=2\pi*t/f_{net}$ with t=time and $f_{net}$=frequency of the voltage of the energy supply grid 16.

The d, q coordinate system in FIG. 4 is assigned to the frequency $f_{net|[sch1]}$ of the voltage $U_{net}$ of the energy supply grid 16 and thus "rotates" with this frequency $f_{net}$.

Figure 5A:
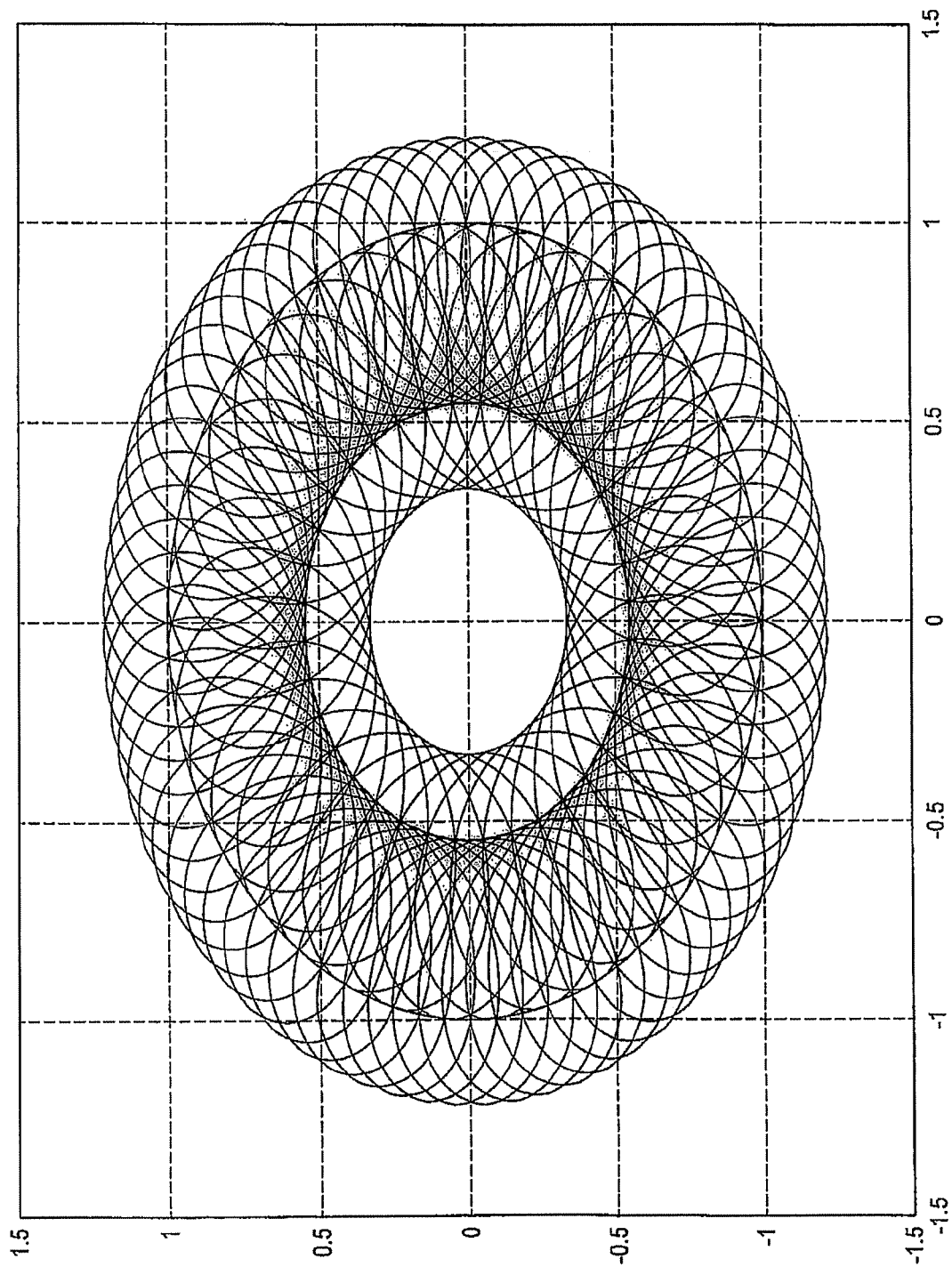
FIGS. 5a and 5b show a schematic diagram of output voltages for the circuit in FIG. 3 and a detail thereof, respectively in a d, q coordinate system.

FIG. 5a shows a number of output voltages $u_0$ in a d, q coordinate system. These output voltages $u_0$ result from the above-explained conversion from the α, β coordinate system to the d, q coordinate system. The output voltages $u_0$ are also not constant in the d, q coordinate system but again form trajectories. In FIG. 5a, the trajectories are shown with the example above within an electrical cycle of 2160 degrees for the generator 12. Owing to the selected example for the frequency ratios of 60 Hz for the generator 12 voltage and 50 Hz for the voltage of the energy supply grid 16, this corresponds to an electrical cycle of 1800 degrees for the energy supply grid 16. The voltage vectors of the trajectories in FIG. 5a thus rotate with an angle speed of 2π*10 Hz.

Figure 5B:
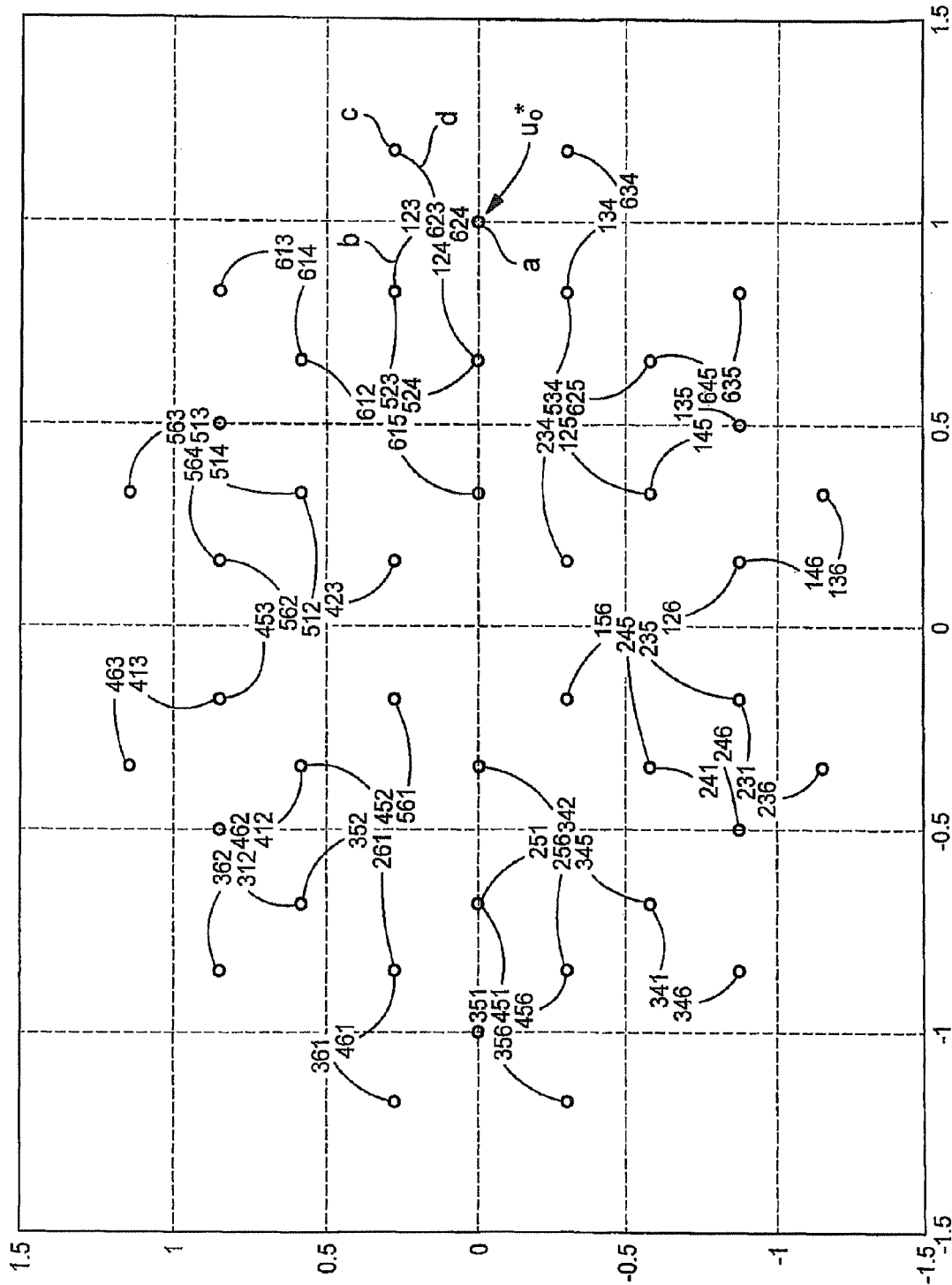

FIG. 5b shows a detail from FIG. 5a. FIG. 5b thus is a d, q coordinate system. The trajectories for the output voltages $u_0$ are the same in FIG. 5b as in FIG. 5a, but only in a range of 24 degrees for the generator 12 and/or 20 degrees for the energy supply grid 16.

In FIG. 5b, the starting point for each trajectory is characterized with an "0." A number combination "xyz" of three digits is furthermore provided for each of the trajectories. This number combination indicates which switch position the three commutators 14a', 14b' and 14c' will assume for the associated trajectory. Since six switch positions are possible for each commutator 14a', 14b' and 14c', each number of the number combination "xyz" can assume a value between 1 and 6. The number combination "614" means, for example, that only the sixth switch is switched conducting in the first commutator 14a', that in the second commutator 14b' only the first switch is switched conducting and that in the third commutator 14c' only the fourth switch is switched conducting.

Starting with the starting point "0" and depending on the respective number combination "xyz," the future course of the associated trajectory is then shown in FIG. 5b above the previously mentioned region.

It follows from the trajectories in FIG. 5b that the individual output voltages $u_0$ are not constant, as previously mentioned, but change with the rotational angle of the generator 12 and/or the energy supply grid 16. The changes in the individual trajectories are respectively developed in different directions, in dependence on the switch positions for the commutators 14a', 14b' and 14c'.

A voltage modulation for the output voltage $u_0$ is described in the following.

For the voltage modulation, a desired value $u_0^*$ is specified for the output voltage $u_0$, wherein this desired value is issued on the output side by the converter 14. This desired output voltage $u_0^*$ has the same frequency as the energy supply grid 16 and represents a fixed point in FIG. 5b, meaning the point (1/0) in the d, q coordinate system. The desired output voltage $u_0^*$ in particular is the voltage at the feed-in point which is composed of the voltage $U_{net}$ of the energy supply grid 16, the voltage drop of the transformer 15 and the voltage drop of the energy supply lines. The voltage $U_{net}$ of the energy supply grid 16 is assumed to be constant. In the final analysis, the converter 14 thus is intended to generate the voltage $U_{net}$ of the energy supply grid 16 from the induced voltages supplied by the generator 12.

Following this, the trajectory is searched for which is closest to the desired output voltage $u_0^*$. For the present example, this is the trajectory with the number combination "624." The commutators 14a', 14b' and 14c' are then set to the associated switch positions. As a result, the output voltage $u_0$ belonging to the number combination "624" is generated by the converter 14. The trajectory belonging to the number combination "624" in that case starts at the point a and moves along the path b. As explained, the trajectory for this output voltage $u_0$ at present shows the least deviation from the desired output voltage $u_0^*$.

Given the initial assumption that the frequency of the generator 12 is higher than the frequency of the energy supply grid 16, the computed trajectories for the output voltages $u_0$ also change. The trajectories and thus also the associated output voltages $u_0$ that are generated by the converter 14 are therefore not constant, as mentioned before. It means that the deviation between the output voltage $u_0$ generated by the converter 14 and the desired output voltage $u_0^*|_{[sch2]}$ can change, in particular can increase. For the present example, the deviation between the trajectory with the number combination "624" and the desired output voltage $u_0^*$ always increases along the path b.

Thus, the above-described steps are carried out once more following a predetermined time interval, for example after a further rotation by a specified angle of the generator 12 and/or the energy supply grid 16. It means that the trajectories from FIG. 5b must be recomputed for the new point in time and a new FIG. 5b with new trajectories for the output voltages $u_0$ is obtained.

From among the newly computed trajectories, the trajectory is again searched for which comes closest to the desired output voltage $u_0^*$. It is assumed that for the present case this is the trajectory with the number combination "623." The commutators 14a', 14b', 14c' are then adjusted to the associated switch positions. As a result, the output voltage $u_0$ belonging to the number combination "623" is generated by the converter 14. The trajectory belonging to the number combination "623" starts at point c and moves along the path d. As assumed, this output voltage $u_0$ shows the least deviation from the desired output voltage $u_0^*$.

We want to point out that for the new point in time, the former trajectory with the number combination "624" can also turn out to be the closest trajectory. In that case, the switch positions for the commutators 14a', 14b' and 14c' are maintained.

Insofar as externally commutated power semiconductor components 18, in particular thyristors, are used we also want to point out that the switching and/or commutating to a different trajectory, for example the trajectory with the number combination "623" is possible only if the thyristors to be shut down have a zero crossing point for the current and can thus be quenched, or if the switching to another trajectory generates a suitable counter voltage which causes a commutation.

The aforementioned, predetermined time interval can be an interval of 100 µs, for example, so that for each 100 µs, the trajectories of the output voltages $u_0$, as well as a suitable trajectory and/or the associated switching state, are computed once more.

The deviations between the respectively computed trajectories and the desired output voltage $u_0^*$ can be determined mathematically with the aid of minimizing methods, such as the method for the least error squares or the like.

A current control for the output current $i_0$ is described in the following.

With the current control, a desired value $i_0^*$ is specified for the output current $i_0$ which is provided by the converter 14 on the output side. This desired value $i_0^*$ has the same frequency as the frequency for the energy supply grid 16 and can be computed from the required output and the voltage $U_{net}$ for the energy supply grid 16. The circuit shown in FIG. 2, for example, can be used as basis for this computation by plotting a complete model of this circuit.

The actual output current $i_0(t)$ for the actual point in time t is detected for the actual switch positions of the commutators 14a', 14b' and 14c'.

Figure 6A:
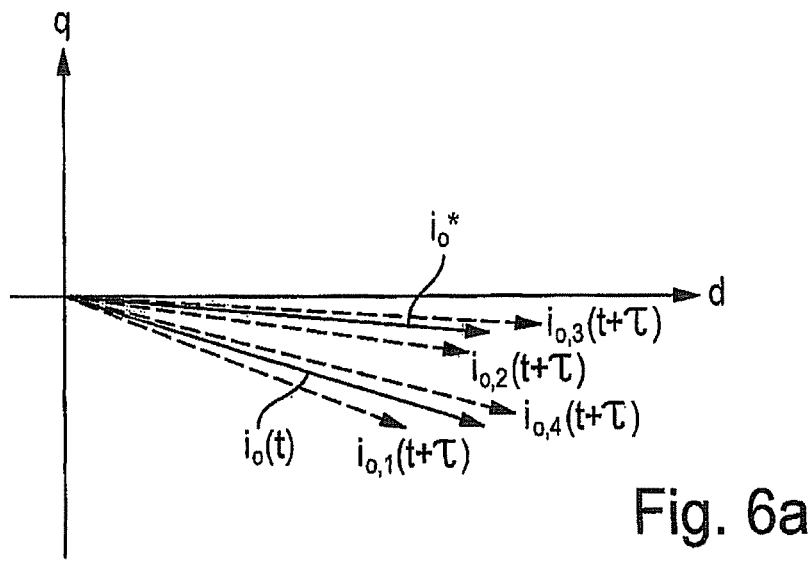
FIGS. 6a, 6b show schematic time diagrams of currents for the circuit shown in FIG. 3, respectively in a d, q coordinate system.

A first variant of the current control is shown in FIG. 6a.

FIG. 6a shows that a future output current $i_{0,k}(t+\tau)$ is respectively computed for each future point in time $t+\tau$ and for different switch positions. The future point in time $t+\tau$ can be a point in time, for example, which is in the future by a time interval of 100 µs or a multiple of 10 µs. The different switch positions are marked in the above with the index k. The computing of the respective output currents $i_{0,k}(t+\tau)$ can be realized in turn with the aid of the trajectory belonging to the respective switch position and the model for the circuit in FIG. 2.

FIG. 6a shows the actual output current $i_0(t)$ for the actual switch position and for the actual point in time t, along with the desired output current $i_0^*$. For the purpose of simplification, four future output currents $i_{0,k}(t+\tau)$ are also shown for the point in time $t+\tau$, with k=1 . . . 4, meaning with four different switch positions for the commutators 14a', 14b' and 14c'. We want to point out that each switching state results in a separate, associated future output current.

The future output current $i_{0,k}(t+\tau)$ is then determined which deviates by the least amount from the desired output current $i_0^*$, wherein this deviation can be determined with the aid of a minimizing method or a quality function or the like. For the present example, shown in FIG. 6a, the future output current $i_{0,2}(t+\tau)$ could be considered the closest one since its current vector end point in the representation according to FIG. 6a is closest to the end point of the current vector for the desired output current $i_0^*$.

Following this, the commutators 14a', 14b' and 14c' are switched to the position in which the closest future output current $i_{0,2}(t+\tau)$ can be generated.

These method steps are continuously repeated, for example every 100 µs.

Figure 6B:
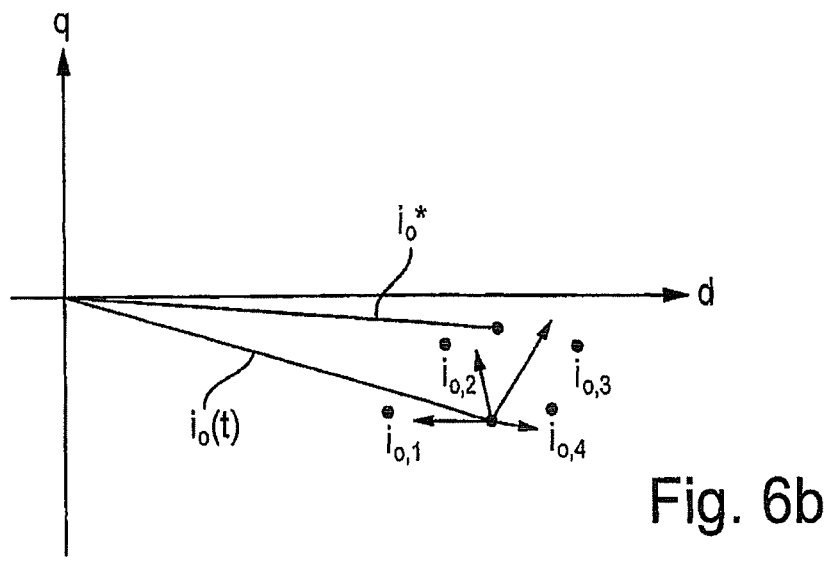

A second variant of the current control is shown in FIG. 6b.

In FIG. 6b, the actual output current $i_0(t)$ for the actual switch position and for the actual point in time t, as well as the desired output current $i_0^*$, are determined in the same way as shown for the case according to FIG. 6a.

The respective time deviations $i_{o,k'}$ for the output currents $i_{o,k}$ are then determined in accordance with FIG. 6b, starting with the actual output current $i_0(t)$ for different switch positions of the commutators 14a', 14b' and 14c'. The index k again characterizes the different switch positions. FIG. 6b shows examples of four deviations $i_{o,k'}$, represented with k= 1 . . . 4, also with four different switch positions for the commutators 14a', 14b' and 14c'.

The time deviation $i_{o,k'}$ is then determined which points as precisely as possible in the direction of the desired output current $i_0^*$. This deviation can be determined with the aid of a minimizing method or a quality function or the like. For the present exemplary case, shown in FIG. 6b, the time deviation $i_{o,2'}$ could be considered the closest one since its indicator in the representation according to FIG. 6b points in the current vector direction for the desired output current $i_0^*$.

Following this, the commutators 14a', 14b' and 14c' are switched to the position in which the output current $i_{o,2}$ can be generated to which the closest deviation $i_{o,2'}$ is assigned.

This method is continuously repeated, for example every 100 µs.

We want to point out that not each pass of the above explained method needs to result in a switching of the positions of the commutators 14a', 14b' and 14c'. As a rule, the switch position for the actual output current $i_0(t)$ remains the same during several passages.

We furthermore want to point out that the switching and/or commutating to a different switch position for the switches 14a', 14b' and 14c' when using externally commutated power semiconductor components 18 is possible only if the thyristors to be shut down have a zero crossing for the current and can thus be quenched, or if the switching to another trajectory leads to a suitable counter voltage which causes a commutating.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for operating a converter, via a control unit, in a system used for generating electrical energy, the system including a generator operatively connected to the converter which, in turn, is operatively connected to an energy supply grid, the frequency of a voltage generated by the generator being variable and a plurality of different switch positions being realizable with the converter, the method comprising:
    converting, in the control unit, voltages responsive to an output from the converter to respective d, q rotating coordinate system voltage trajectories, each being representative of a current voltage value and future voltage values;
    specifying a desired voltage value matching a frequency of a voltage of the energy supply grid;
    determining, from the d, q rotating coordinate system voltage trajectories, a closest trajectory having a current value closest to the desired voltage value and
    switching the converter in dependence on the closest trajectory, the switching being based upon a frequency of the voltage of the energy supply grid;
    wherein the specifying, the determining, and the switching are recomputed at predetermined time intervals.

2. The method to claim 1, wherein the voltages responsive to an output from the converter are α,β coordinate system voltage values.

3. The method according to claim 1, wherein the converter is switched to the position which allows generating an output voltage that is assigned to the closest trajectory.

4. The method according to claim 1, wherein the desired voltage value is a desired output current value and wherein the future values are future output current values for different switch positions of the converter.

5. The method according to claim 4, wherein the future output is determined which is relatively closest to the desired output current.

6. The method according to claim 5, wherein the converter is switched to the position in which the output voltage is generateable that is assigned to the closest future output current.

7. The method according to claim 1, wherein the desired voltage value represents a desired output current.

8. The method according to claim 1, wherein the switching includes changing one or more converter switch positions to output the closest trajectory.

9. The method according to claim 1, wherein the desired value is specified in dependence on the energy supply grid.

10. The method according to claim 1, wherein the frequency of the voltage generated by the generator is relatively higher than the frequency of the voltage of the energy supply grid.

11. The method according to claim 1, wherein the converter comprises a plurality of external commutating or self-commutating power semiconductor components, and wherein for external-commutating power semiconductor components, the converter is switchable to another switch position only if the power semiconductor components to be shut down in the process have a zero crossing for the current or if a counter voltage is generated by turning on a power semiconductor component.

12. A system, comprising:
   a converter, operatively connected to an energy supply grid, useable to realize a plurality of different switching positions;
   a generator, operatively connected to the converter, a frequency of a voltage produced by the generator being variable; and
   a control unit configured to convert voltages responsive to an output from the converter to respective d, q rotating coordinate system voltage trajectories, each being representative of a current voltage value and future voltage values;
   wherein the system is configured to:
   specify a desired voltage value matching a frequency of a voltage of the energy supply grid;
   determine, from the d, q rotating coordinate system voltage trajectories, a closest trajectory having a current value closest to the desired voltage value; and
   switch the converter in dependence on the closest trajectory, the switching being based upon a frequency of the voltage of the energy supply grid;
   wherein the specifying, the determining, and the switching are recomputed at predetermined time intervals.

13. The system according to claim 12, wherein the generator is operatively connected to a electrical energy producer and is driven by the electrical energy producer.

14. The system according to claim 12, wherein the generator is a n-phase polygonal generator and the converter is a direct converter or a matrix converter.

15. The method according to claim 2, wherein output voltage is determined from voltage generated by the generator.

16. The method according to claim 2, wherein the desired voltage value is a desired output current value and wherein the future values are future output current values for different switch positions of the converter.

17. The method according to claim 11, wherein the plurality of external commutating or self-commutating power semiconductor components include at least one of insulated gate bipolar transistors (IGBTs) or integrated gate commutated thyristors (IGCT) or thyristors.

18. The system according to claim 13, wherein the electrical energy producer is a gas turbine or a water turbine or a wind power plant.

19. The system according to claim 13, wherein the generator is a n-phase polygonal generator and the converter is a direct converter or a matrix converter.

* * * * *